June 3, 1952   J. A. HJULIAN   2,598,913
EXTRUSION APPARATUS
Filed Oct. 17, 1949   3 Sheets-Sheet 2
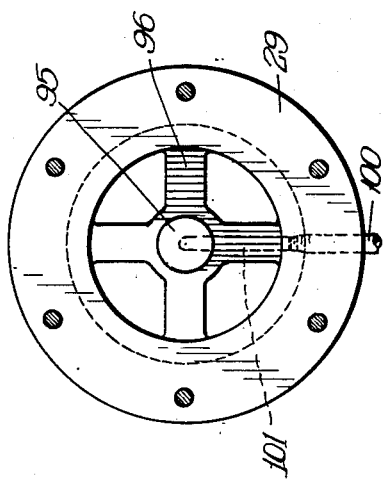
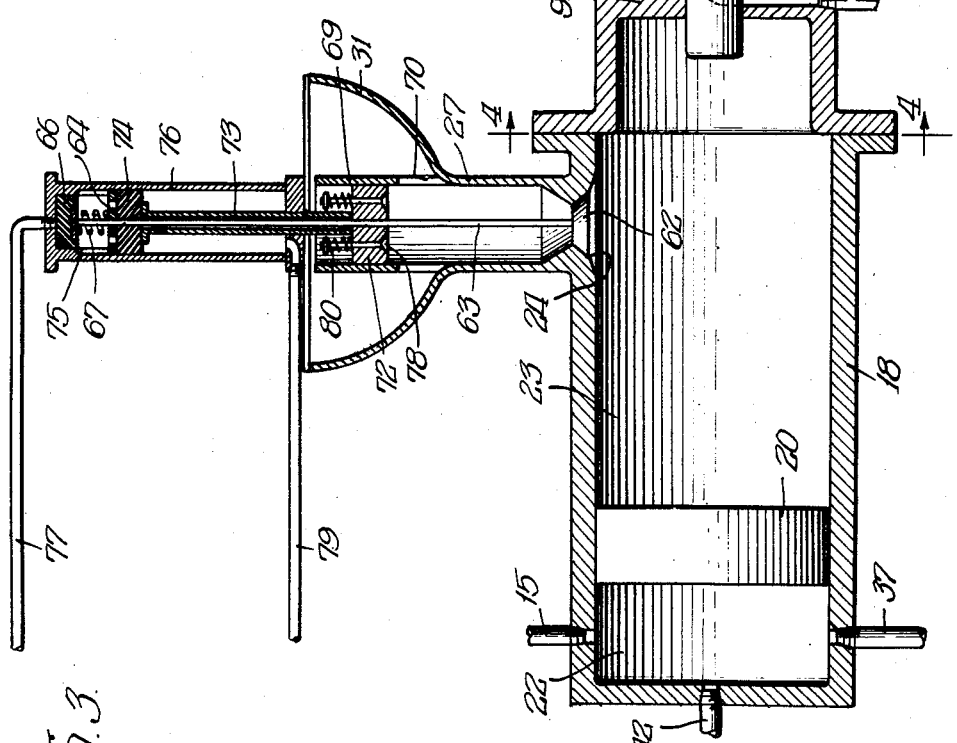
INVENTOR.
Julius A. Hjulian,
BY
Wilkinson Huxley, Byron & Hume
Attys.

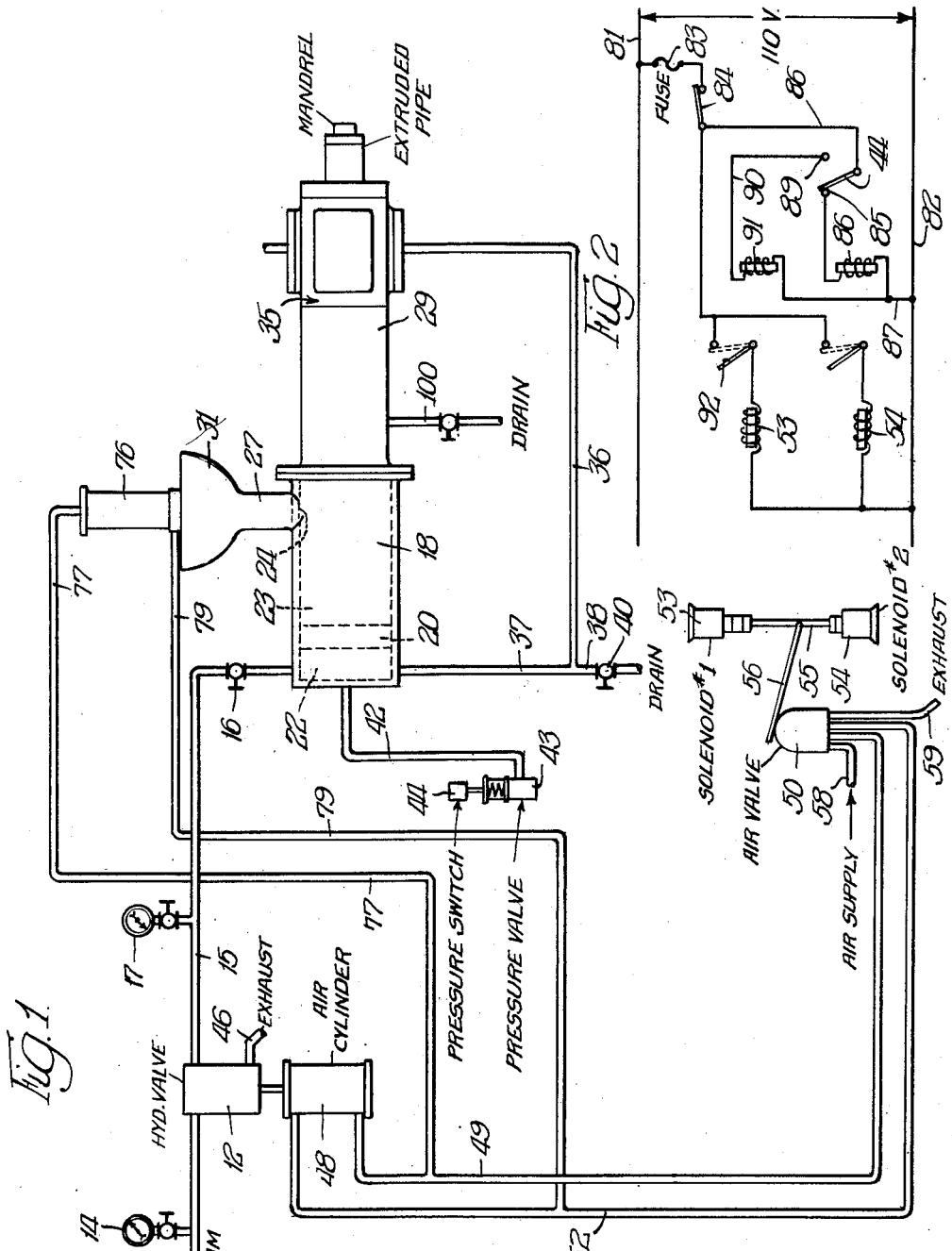

June 3, 1952
J. A. HJULIAN
2,598,913
EXTRUSION APPARATUS
Filed Oct. 17, 1949
3 Sheets-Sheet 3
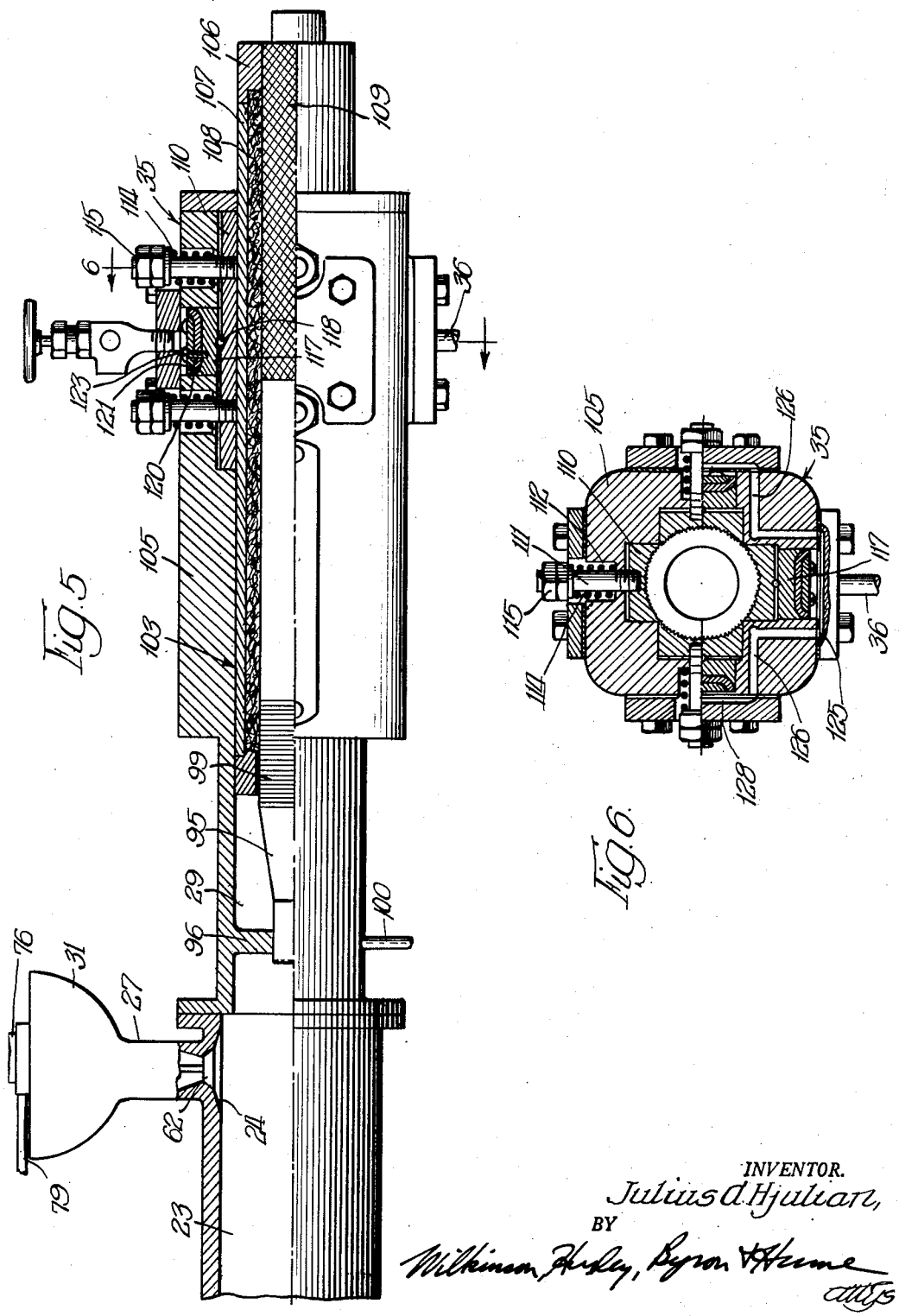
INVENTOR.
Julius A. Hjulian,
BY
Wilkinson, Huxley, Byron & Hume
ATTYS Patented June 3, 1952

2,598,913

UNITED STATES PATENT OFFICE 2,598,913

EXTRUSION APPARATUS

Julius A. Hjulian, Palos Heights, Ill., assignor to Crane Co., Chicago, Ill., a corporation of Illinois Application October 17, 1949, Serial No. 121,697

7 Claims. (Cl. 25—16)

This invention relates to a new and improved apparatus for the production of cement asbestos pipe or the like by an extrusion process and more particularly to such an apparatus adapted to operate upon a water slurry of cement and asbestos fibres or the like and to drain a portion of the water from the slurry and compact the residue into a dense mass.

Pipe or generally similar shapes have heretofore been made from a mortar or slurry of cement and asbestos by various molding and forming processes. These prior processes have numerous limitations in that the shape produced is limited to the length and size of the form or mold. Further, such methods and apparatus do not lend themselves to the making of a hard, dense product since adequate pressures are not applied, or the necessary proportion of the entrained water is not removed or both objections are present.

While a cement asbestos slurry is referred to herein, it is to be understood that the slurry may contain other constituents, such for example as coloring or waterproofing materials or reagents for affecting the setting time of the mixture. It will also be understood that varying proportions of finely divided aggregate, such as sand, may be added if desired and if consistent with the necessary strength of the product.

It is an object of the present invention to provide a new and improved apparatus for the extrusion of cement asbestos pipe or the like.

It is a further object to provide apparatus of this character which provides a dense and compact product.

It is also an object to provide apparatus which will produce pipe or the like in continuous lengths.

It is another object to provide apparatus which is substantially continuous in operation and in which the cycle of operation is automatically controlled.

It is an additional object to provide apparatus of this character in which substantial portions of entrained air and water are removed from the slurry without substantial loss of the solid constituents.

Other and further objects will appear as the description proceeds.

I have shown certain preferred embodiments of my invention in the accompanying drawings, in which—

Figure 1 is a somewhat diagrammatic layout of the apparatus;

Figure 2 is a wiring diagram of the control circuits;

Figure 3 is a fragmentary vertical section, on an enlarged scale, showing the slurry supply and pressure apparatus;

Figure 4 is a section taken on line 4—4 of Figure 3;

Figure 5 is a view on an enlarged scale, partly in section, of the pressure chamber and brake assembly; and Figure 6 is a section taken on line 6—6 of Figure 5.

Referring first to Figure 1, the supply of liquid under pressure is introduced through pipe 11 to the hydraulic valve 12, the pressure gauge 14 being connected to show this pressure. From the valve 12, the line 15 leads to the left end of the pressure cylinder 18. The line 15 is shown provided with a second pressure gauge 17 to indicate the liquid pressure between the valve 12 and pressure cylinder 18. The pressure cylinder 18 contains a floating piston 20 which divides the operating fluid chamber 22 from the slurry-receiving portion 23 of the cylinder. The pressure cylinder 18, as shown in Figures 3 and 5, is connected by port 24 to the passage 27 which leads to the slurry hopper 31.

The pressure cylinder 18 opens into the pressure chamber 29, the right-hand end of which carries the brake assembly 35. The brake assembly 35 is shown as connected by pipe 36 to pipe 37 which leads to the liquid chamber 22 in the pressure cylinder 18. The two pipes 36 and 37 are connected to a drain pipe 38 controlled by valve 40. The pipe 42 leads from the water end 22 of the pressure cylinder 18 to the pressure valve 43 which actuates the pressure switch 44.

The hydraulic valve 12 is provided with an exhaust connection 46. This valve 12 is operated by means of a piston contained in air cylinder 48. The lower end of air cylinder 48 is connected by pipe 49 to the air control valve 50. The upper end of the air cylinder 48 is connected by pipe 52 to the air valve 50. Solenoid No. 1, indicated at 53, and solenoid No. 2, indicated at 54, serve to reciprocate the rod 55. This rod has connected thereto the lever 56 which serves to operate the air valve 50. Air valve 50 receives its supply of air under pressure through pipe 58 and has an exhaust pipe 59 connected thereto.

As shown in Figure 3, the passage 27 connecting the slurry hopper 31 to the pressure cylinder 18 has a valve seat at its lower end about the port 24 and an associated valve 62. This valve has a stem 63 passing through spider 64 in the cylinder 76 and a disc 66 is carried at the upper end of the valve stem. A compression spring 67 is located between the spider 64 and disc 66 and normally retains the valve in closed position against the valve seat. The passage 27 has a portion 69 extending upwardly into the hopper 31, the lower part of this extension 69 being provided with lateral openings 70 to receive material from the hopper 31. The plunger 72 is fitted into the tubular portion 69 and is connected by a tubular piston rod 73 with a piston 74 carried in cylinder 76. This cylinder is air-operated and its upper end is connected by pipe 77 to the pipe 49, as shown in Figure 1, which serves to lead air to the lower end of the hydraulic valve control cylinder 48. The lower end of cylinder 76 is connected by air pipe 79 with air pipe 52 which connects the upper end of the hydraulic valve air cylinder 48 with the air valve 50.

The inner upper end of cylinder 76 is provided with longitudinal slots 75 so that, after the disc 66 is moved downwardly by air pressure, air can move around the edge of the disc and through spider 64 against the upper face of the piston 74. The plunger 72 carries the poppet relief valves 78 normally held closed by springs 80. These valves 78 permit passage of air upon upward movement of plunger 72, which breaks any vacuum which may tend to be formed in passage 27.

Referring next to the circuit diagram of Figure 2, the 110 volt power lines 81 and 82 are connected through fuse 83 and manual control switch 84 to the operating control switches and relays. The solenoids No. 1 and No. 2 are shown at 53 and 54 on the circuit diagram. The pressure switch 44 is also shown on this diagram, the permanently connected side of the switch being directly connected by line 86 with the manual switch 84. The switch terminal 85 is connected through the coil 86 of a delayed operating relay, the other side of this coil being connected by line 87 to the opposite side 82 of the power line. The other contact 89 of pressure switch 44 is connected through line 90 to the coil 91 of a quick operating relay which serves to control solenoid No. 1 through the relay contact 92.

The construction of the brake assembly 35 of Figure 1 is shown in detail in Figures 5 and 6 in connection with the showing of the pressure chamber 29. The pressure chamber 29 contains the mandrel 95 which is supported from the spider 96 extending from the inner walls of the pressure chamber 29. This mandrel 95 is shown as provided with a water withdrawal section 99 having a plurality of narrow slitted openings communicating with the inside of the mandrel. The detailed construction of this section 99 forms no part of the present invention and is fully disclosed in my co-pending application Serial No. 101,346, filed June 25, 1949.

The drain connection 100 is provided connected to passage 101 which extends through one leg of spider 96 from the inside of mandrel section 99 for withdrawing fluid and entrained air and finely divided solids which may pass through the slits in the section 99. It will be understood that this drain 100 may be connected to a source of sub-atmospheric pressure so that the withdrawal may be facilitated by suction.

As best shown in Figure 5, a slurry support sleeve 103 is located fitting about the mandrel 95 and within the cylindrical portion 105 of the pressure chamber assembly. This sleeve 103 comprises two end rings 106, an outer tubular portion 107 preferably formed of rubber or similar material, and an inner body portion 108 which may be formed from a synthetic resin reinforced with textile fibres. As indicated at 109, the mandrel may have a part of its outer surfaces knurled or otherwise roughened to facilitate gripping of the compacted pipe.

The brake assembly, as shown in Figures 5 and 6, comprises a plurality of brake shoes 110 which are normally held in the outer position in the housing 105. These brake shoes 110 are each provided with a pair of studs 111 passing upwardly through recesses 112 in the housing. Compression springs 114 bear against nuts 115 carried by the studs 111 and also against the base of the recesses 112. The springs 114 serve to normally maintain the shoes 110 retracted. As shown in Figure 5, each shoe 110 is provided with a floating operating piston 117, the piston pressing against a ball 118 which engages the outer face of the shoe 110. Each floating piston 117 is provided with a cup-shaped washer 120 on its upper face, this washer being held in place by a plate 121 and bolts 123.

The pipe 36 introduces hydraulic pressure into the brake assembly and into a chamber 125, shown in Figure 6, which chamber communicates through passages 126 with the similar adjacent chambers 128. It will be understood that these chambers 128 are similarly connected to another such chamber for operating the upper brake shoe.

In the operation of the apparatus, the hopper 31 of Figure 1 will be partially filled with a supply of suitable slurry and the pipe 11 will be connected to a continuous source of liquid under pressure. To put the system in operation, the main switch 84, shown in Figure 2, is manually closed. There being no pressure in the water end 22, shown in Figure 1, of the pressure cylinder at this time, the pressure switch will be in position contacting the delayed relay 86, shown in Figure 2, to actuate solenoid No. 2. This moves the air valve to the position to supply air through pipe 52 to the top of air cylinder 48, thus pulling down and opening the hydraulic valve 12. Simultaneously, this air pressure is supplied through pipe 79 to the lower end of cylinder 76, maintaining the slurry feed mechanism in the position in which it is shown in Figure 3.

Referring again to Figure 1, the liquid under pressure passes through pipe 15 to valve 16, which is open to the liquid end 22 of pressure cylinder 18. This urges the floating piston 20 to the right, compressing the slurry in the pressure cylinder 18 and through the direct connection, compressing the slurry in the pressure chamber 29. As the pressure starts to build up in the pressure cylinder water end 22, this pressure passes through lines 36 and 37 of Figure 1 to the brake assembly 35 where, as shown in Figures 5 and 6, the pressure forces the brake shoes 110 inwardly to grip the sleeve 103, this serving to hold the support sleeve against movement and to resist the pressure on the slurry and cause it to be compacted. Water from the slurry, together with entrained air and a minor portion of entrained finely divided solids, passes through the exposed slits in the drainage section 99 of the mandrel 95 and is drawn off through pipe connection 100.

Referring now particularly to Figures 1 and 2, as the pressure builds up in water pressure chamber 22, it is also transmitted to the pressure valve 43 which operates it to swing the switch arm 44 out of contact with the contact 85 and into contact with the contact 89. This serves to operate the instant relay 91 and thereby solenoid No. 1 at 53 swings arm 56 to reverse the position of air valve 50. In this position, air valve 50 serves to connect the air under pressure through pipe 49 to the lower end of air cylinder 48 and through pipe 77 to the upper end of cylinder 76. This air pressure forces the piston in cylinder 48 upwardly, closing the hydraulic valve 12 so as to close off the supply of pressure liquid to pipe 15 and to the pressure cylinder 18. This high pressure liquid may then be exhausted through valve 12 and exhaust pipe 46.

As shown in Figure 3, at the same time the air pressure supplied to the upper end of cylinder 76 forces the disc 66 downwardly against the resistance of spring 67, disc 66 moves valve stem 63 downwardly, unseating valve 62. As disc 66 moves downwardly opposite grooves 75, air passes through these grooves and through spider 64 against the upper face of piston 74 which, through tubular piston rod 73, forces plunger 72 downwardly. This plunger 72 forces slurry down through passage 27 and through port 24, around valve 62, into the pressure chamber 18.

When pressure is released in the water end 22 of the pressure cylinder, it is also released behind the brake shoes 110 of Figure 5 since the chambers behind them are connected by pipes 36 and 37 to chamber 22, as shown in Figure 1. The compression springs 114 of Figure 5 then retract the brake shoes 110 and the sleeve 103 is free to move to the right under the residual pressure in the system. It will be understood that the brakes are released substantially instantaneously upon drop of pressure in chamber 22 of Figure 1, while a certain amount of pressure will be maintained for a very short period of time through the slurry in the pressure cylinder 18 and into the pressure chamber 29. While the liquid and solids, which are the main constituents of the slurry, are substantially non-compressible, there is a certain amount of air necessarily entrained in the slurry when it is mixed and this air is compressible. The expansion of this compressed air is a factor in supplying pressure to move the support sleeve 103 of Figure 5 to the right and, also, move the compressed slurry or formed pipe after the support sleeve 103 has left the pressure cylinder.

Considering particularly Figures 1 and 2, when the liquid pressure is reduced, another action which takes place is that pressure is reduced on a pressure valve 43 which permits the pressure switch 44 to swing back to the opposite position in engagement with contact 85. This energizes the delayed action relay 86 and solenoid No. 2. It has been found desirable to have a delayed action at this point so as to give an appreciable, though short, period of time for the movement of the slurry and formed pipe to the right, as seen in the drawings. At the end of this short delay in the actuation of solenoid No. 2, the air valve is reversed, air is supplied to the top of air cylinder 48 which again opens the hydraulic valve 12. At the same time, air is supplied through pipe 79 to the lower end of cylinder 76 and piston 74 is forced upwardly. As this takes place, the disc 66 is moved upwardly by the spring 67. The movement of disc 66 pulls up the valve stem 63 and closes valve 62. The upward movement of piston 74 pulls up the plunger 72, poppet valves 78 opening until the plunger clears the lower edge of openings 70. Slurry is now free to flow through these openings 70 to refill the passage 27. Pressure again builds up in the pressure end 22 of cylinder 18 and the process continues as before. It will be understood that the body of slurry in hopper 31 is not under pressure and, thus, the hopper may be refilled from time to time without interrupting the cycle of operation. The process of forming pipe may, therefore, be substantially continuous, although the forming action itself is intermittent, as has been described.

The specific form of construction shown is to be understood to be illustrative only, as it is capable of variation to meet differing conditions and requirements, and I contemplate such modifications as come within the spirit and scope of the appended claims.

I claim:

1. Apparatus for the extrusion of pipe or the like from a water carrying slurry which comprises a pressure chamber having an open end, means for supplying slurry to said chamber, hydraulic means for applying pressure to the slurry in the chamber, means for withdrawing fluid from slurry in the chamber, a brake fixedly located within and adjacent to the open end of the pressure chamber, said brake having radially acting opposed jaws for gripping formed material in the chamber, and means for moving the jaws into gripping position and into released position.

2. Apparatus for the extrusion of pipe or the like from a water carrying slurry which comprises an elongated pressure chamber having a closed intake end and an open discharge end, a pressure cylinder having a passage connecting the cylinder to the closed end of the pressure chamber, means for supplying slurry to the pressure cylinder, a brake fixedly located within and adjacent to the open end of the pressure chamber, said brake having jaws for gripping formed material in the chamber, and means for positively moving the jaws into gripping position and positively moving the jaws into released position.

3. Apparatus for the extrusion of pipe or the like from a water carrying slurry which comprises an elongated pressure chamber having a closed intake end and an open discharge end, a pressure cylinder having a passage connecting the cylinder to the closed end of the pressure chamber, means for supplying slurry to the pressure cylinder, passages for withdrawing fluid from the pressure chamber, a brake located at a fixed point within and adjacent to the open end of the pressure chamber, said brake having a plurality of opposed radially movable jaws for gripping formed material, and means for reciprocating said opposed jaws in opposite directions.

4. Apparatus for the extrusion of pipe or the like from a water carrying slurry which comprises an elongated pressure chamber having a closed intake end and an open discharge end, a pressure cylinder having a passage connecting the cylinder to the closed end of the pressure chamber, means for supplying slurry to the pressure cylinder, a mandrel extending axially of the pressure chamber, passages formed in the mandrel for withdrawing fluid from the pressure chamber, a brake carried by the pressure chamber at a point adjacent its open end, said brake having radially movable jaws for gripping formed material and urging it against opposite faces of the mandrel, and means for moving said jaws into and out of gripping engagement.

5. Apparatus for the extrusion of pipe or the like from a water carrying slurry which comprises an elongated pressure chamber having a closed intake end and an open discharge end, a pressure cylinder having a passage connecting the cylinder to the closed end of the pressure chamber, a movable piston in said pressure cylinder, valve controlled connections for supplying fluid under pressure to move said piston, a slurrry supply chamber, means connecting said chamber to the pressure cylinder, means for forcing slurry from the supply chamber into the pressure cylinder, a fluid power cylinder having a piston connected to and moving the slurry forcing means, a second fluid power cylinder having a piston connected to the valve controlling supply of fluid under pressure to the pressure cylinder, means for supplying fluid to the two fluid power cylinders, and means actuated by the fluid pressure in the pressure cylinder for controlling the flow of fluid to the fluid power cylinders.

6. Apparatus for the extrusion of pipe or the like from a water carrying slurry which comprises an elongated pressure chamber having a closed intake end and an open discharge end, a pressure cylinder having a passage connecting the cylinder to the closed end of the pressure chamber, a movable piston in said pressure cylinder, valve controlled connections for supplying fluid under pressure to move said piston, a slurry supply chamber, means connecting said chamber to the pressure cylinder, means for forcing slurry from the supply chamber into the pressure cylinder, a fluid power cylinder having a piston connected to and moving the slurry forcing means, a second fluid power cylinder having a piston connected to the valve controlling supply of fluid under pressure to the pressure cylinder, means for supplying fluid to the two fluid power cylinders, movable brakes carried within and adjacent to the open end of the pressure chamber, fluid pressure means for actuating the brakes, a connection between the brake actuating means and the fluid pressure in the pressure cylinder, and means actuated by the fluid pressure in the pressure cylinder for controlling the flow of fluid to the fluid power cylinders.

7. Apparatus for the extrusion of pipe or the like from a water carrying slurry which comprises an elongated pressure chamber having a closed intake end and an open discharge end, a pressure cylinder having a passage connecting the cylinder to the closed end of the pressure chamber, a movable piston in said pressure cylinder, valve controlled connections for supplying fluid under pressure to move said piston, a slurry supply chamber, means connecting said chamber to the pressure cylinder, means for forcing slurry from the supply chamber into the pressure cylinder, a fluid power cylinder having a piston connected to and moving the slurry forcing means, a second fluid power cylinder having a piston connected to the valve controlling supply of fluid under pressure to the pressure cylinder, means for supplying fluid to the two fluid power cylinders, radially movable brakes carried within and adjacent to the open end of the pressure chamber, fluid pressure means for actuating the brakes, a connection between the brake actuating means and the fluid pressure in the pressure cylinder, a two-way switch actuated by the fluid pressure in the pressure cylinder, a valve for supplying fluid to the two fluid power cylinders to alternately apply pressure and force slurry from the supply chamber, and electrical means controlled by the two-way switch for actuating said valve.

JULIUS A. HJULIAN.

REFERENCES CITED

The following references are of record in the file of this patent:

UNITED STATES PATENTS

| Number | Name | Date |
|---|---|---|
| 1,246,048 | Brown | Nov. 13, 1917 |
| 1,288,496 | Brosius | Dec. 24, 1918 |
| 1,585,149 | Humphrey | May 18, 1926 |